United States Patent
Geiger et al.

[11] Patent Number: 6,024,046
[45] Date of Patent: Feb. 15, 2000

[54] DOGGIE SLEEPING HOLE

[76] Inventors: Colleen A. Geiger, 9 Crossway, Middletown, N.J. 07748; Susan Henninger Fetta, 5843 Eucalyptus La., Los Angeles, Calif. 90042

[21] Appl. No.: 09/033,624

[22] Filed: Mar. 4, 1998

[51] Int. Cl.$^7$ .......................................... A01K 1/03
[52] U.S. Cl. .............................................. 119/28.5
[58] Field of Search ................. 119/28.5; 5/473, 5/420, 603, 636, 637, 481, 655, 656

[56] References Cited

U.S. PATENT DOCUMENTS

| D. 328,506 | 8/1992 | McMahon | D30/118 |
|---|---|---|---|
| D. 338,284 | 8/1993 | Barreto | D30/118 |
| D. 346,246 | 4/1994 | Barreto | D30/118 |
| D. 351,687 | 10/1994 | McMahon | D30/118 |
| 2,032,248 | 2/1936 | Bins | 119/1 |
| 3,902,456 | 9/1975 | Davis | 119/1 |
| 5,002,014 | 3/1991 | Albin | 119/28.5 |
| 5,010,843 | 4/1991 | Henry | 119/28.5 |
| 5,033,408 | 7/1991 | Lanfenbahn | 119/28.5 |
| 5,136,981 | 8/1992 | Barreto | 119/28.5 |
| 5,226,384 | 7/1993 | Jordan | 119/28.5 |
| 5,265,558 | 11/1993 | Schonrock | 119/28.5 |
| 5,551,373 | 9/1996 | O'Donnell | 119/28.5 |
| 5,603,284 | 2/1997 | Freedman | 119/28.5 |
| 5,685,258 | 11/1997 | Fricano | 119/28.5 |

OTHER PUBLICATIONS

Classic Slumber Nest, Drs. Foster & Smith Catalog, vol. 97–17 p. 7.
Pillow Beds, Drs. Foster & Smith Catalog, vol. 97–17, pp. 4–6.
Denim Lounger R.C. Steele Wholesale Pet & Animal Care Supplies Holiday Preview 1997, p. 6.
Snuggle Ball R. C. Steele Wholesale Pet & Animal Care Supplies Holiday Preview 1997, p. 7.

*Primary Examiner*—Thomas Price
*Attorney, Agent, or Firm*—Robert M. Skolnik

[57] ABSTRACT

This invention relates to a bed for dogs, more particularly to a single-unit, liquid impermeable foam bed containing a hollowed portion or "hole" in which the dog will lie down; a head/elbow rest or "shelf" for the dog's comfort and security; and a removable/washable cover.

9 Claims, 2 Drawing Sheets

DOGGIE SLEEPING HOLE

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

Dog owners consider their dogs as members of the family. That being the case, dogs are deserving of a comfortable and secure place in which to sleep. This invention relates to a bed for dogs, more particularly to a single-unit foam bed containing a hollowed portion or "hole" in which the dog's body will lie; a head/elbow rest or "shelf" for the dog's comfort and security; and a removable/washable cover.

Although this invention is entitled Doggie Sleeping Hole, and the purpose of same is described as a bed for dogs, this bed is not limited solely to Dogs' use, but may be used by any pet finding comfort and security within the bed.

This dog bed came to light when four dogs were observed digging a hole in a cushion which had been placed on the floor for the purpose of becoming the dogs' sleeping bed. When the dogs had finished, the first Doggie Sleeping Hole was created. This cushion, with its hollowed section or "hole" became the favorite sleeping place for all of the dogs ranging in size from Chihuahua to Greyhound. When thinking about why the dogs prefer this hollowed bed, it made sense, its instinct. Although today's dogs are considered domesticated, they still follow their instincts. Dogs prefer to sleep, and feel more secure in recessed areas. Indeed, when dogs are outside, most will dig a hole in the dirt in which to lie down and rest their bodies, while keeping their heads raised somewhat so as not to have their view obstructed. The dog's protective instinct must not be interfered with in any way by a view obstruction. Dogs have also been known to circle several times in an area before lying down in a "balled-up" position. It is with this background that this dog bed is presented.

There are several beds for dogs currently on the market. The most popular bed available can be described as having a bottom cushion, or "lying down area", surrounded by vertical walls, except for a small opening in which the dogs can enter/exit. An example of these beds can be found in the Doctors Fosters & Smith catalog, Vol. 97-17, page 7, referred to as Classic Slumber Nest, and the R.C. Steele Wholesale Pet & Animal Care Supplies catalog, Holiday Preview 1997, page 6, referred to as Denim Lounger. Beds such as these have been disclosed and patented in prior art. Examples of prior art are U.S. Pat. Nos. D328,506 and D351,687. These designs, although constructed with the comfort of the dog in mind, fail to consider the view obstruction caused by the vertical walls. While lying down, the dog's view is limited to where the opening is for entrance/exit. Dogs prefer to lie in recessed areas, keeping their head up. Surely, when outside, dogs do not build walls, they dig holes. Another popular bed for dogs is a pillow-like cushion. Examples of such dog pillows can be found in the Doctors Foster & Smith catalog, Vol. 97-17, pages 4–6. These "pillows", while aiming to provide comfort for a sleeping dog, fail to provide the security a dog needs. Most dogs will lie up against walls, furniture, or the like, to obtain a secure feeling for sleeping. These pillows are flat in design thereby eliminating a place for the dog to snuggle up against. There further exists prior art, while similar in fashion to the dog beds with vertical walls, these beds are intended to form certain designs or shapes. This prior art appears to have more of an aesthetic appeal as opposed to a comfort/security purpose for the dog. Examples such as U.S. Pat. No. D346,246 and D338,284 are representative of these types of dog beds.

In addition to beds previously mentioned, also found in the R.C. Steele Wholesale Pet & Animal Care Supplies catalog, Holiday Preview 1997, page 7, for purchase, is a bean bag type of dog bed, filled with a soft polyfil, and covered with fleece. This bed allows the dog to knead the fleece to create its own sleeping nest. Although the idea of a recessed area for dogs to sleep is put to use, the bed is very flexible, and as a result of this flexibility, the security sought by dogs is somewhat diminished. Dogs much prefer to lie against harder, more solid objects as opposed to objects that mold to their bodies. Further, the fleece covering, although soft and comfortable, would appear to be rather warm, especially in the summer months.

Further, there exists prior art which makes reference to beds that are easily assembled, dissembled, and washable. An example is U.S. Pat. No. 5,144,911. Although this particular bed is aimed at tidiness, cleanliness, and is aesthetically appealing in appearance, it seems like a rather burdensome task to assemble and disassemble, not to mention the crevices created for the build-up of hair and the like between washings. A removable, washable cover placed over a single-piece foam base would appear to be much easier to maintain and a healthier environment. Indeed, some recent prior art makes reference to a quick changeable cover such as U.S. Pat. No. 5,033,408. With this in mind, when using a removable, washable cover, it becomes important that the base unit of the bed have a "closed pore", "liquid impermeable" outer skin to repel any liquid, urine, or any other secretions that may be excreted by the dog. This goal can be accomplished in a number of ways. First, the bed can be molded in a particular way so as to cause a closed pore skin to form on the bed. This becomes an important claim in U.S. Pat. No. 5,265,558 and U.S. Pat. No. 5,002,014. Although both patents claim to have a liquid impervious coating, neither provide the secure, natural sleeping environment that dogs prefer. Indeed, U.S. Pat. No. 5,002,014 is actually a mattress in design and falls prey to the inadequacies mentioned with regard to the pillow-type beds. Furthermore, U.S. Pat. No. 5,265,558, sets forth an improved method of manufacturing the basic structure of the animal bed to comprise a one-pieced integral foam bed with a liquid-impermeable closed pore outer skin. The manufacturing process disclosed in this prior art could be used in making the dog bed described in this patent application, however, the design or shape of U.S. Pat. No. 5,265,558 is somewhat like the aforementioned beds containing a bottom cushion with vertical walls and an opening for entrance/exit. Another option, as opposed to the molding process, is to simply cover the foam with any material which would cause the bed to be liquid-impermeable.

Prior art found to be of similar idea are U.S. Pat. Nos. 3,902,456, 2,032,248, and 5,010,843. These patents refer either to a recessed area (or "trough") for a pet to sleep, or are circular in design with vertical walls surrounding the entire perimeter. These "donut" shaped beds fall into the category of view obstruction along with beds previously mentioned. Further, these beds are manufactured by sewing several pieces together, giving opportunity for tearing and the creation of crevices for debris build-up. Although the goal of all related prior art is to provide a secure, comfortable sleeping environment for dogs, the patent sought herein suggests creating a hole as opposed to the building of walls. Therefore, the complete opposite approach is undertaken. Indeed, U.S. Pat. No. 5,010,843 refers to a dog's instinct to seek out recessed areas in which to sleep. However, the bed itself is designed with a trough for the animal to lie down, surrounded by pillows on each side, allowing a place for the dog's head to be exposed for security. This patent, although aimed at comfort, a more natural sleeping environment, and security for the dog, fails to completely satisfy the dogs needs, as it limits the dog's sleeping positions. Indeed, although the side pillows are removable, this patent falls prey to the burdensome task of assembling and disassembling the bed for washing, gives opportunity for the stitching to loosen from repeated washings, and creates the perfect environment for hair and debris build-up between washings.

After reading the above, it becomes apparent that there is opportunity for a new dog bed that solves the problems raised with regard to the prior art referenced herein. First, the objective of this invention is to provide a comfortable, secure, natural environment for dogs to sleep. Indeed, dogs themselves were the inspiration of the Doggie Sleeping Hole, and in some way have shown people what they want. Instinct is the basis for this Doggie Sleeping Hole. That being the case, it is the intent of the Doggie Sleeping Hole to overcome the objections raised with regard to the related prior art.

BRIEF DESCRIPTION OF THE INVENTION

Dogs seek out security by way of snuggling against surfaces, while keeping their senses alert. This invention calls for a single-unit foam cushion, either treated or covered to be liquid-impermeable, which contains a recessed area or hole. This hole may be either circular or oval in design. The depth of this hole shall not result in less than the appropriate amount of foam being left on the bottom to support the weight of the dog. The hole shall also vary in diameter to conform to the size differences for all dogs. Further, the location of the hole may vary according to the bed's size and shape. Indeed, as an example, the original prototype was a cushion rectangular in shape. The hole was placed closer to one end of the foam cushion, thereby leaving a larger cushion area on one side of the hole than the other. This larger area served as a resting shelf providing the dog with many options in which to position itself. This single-unit base, was covered by a liquid-impermeable material, and further had a removable, washable fabric cover.

After reading the description of the above described prototype, you will agree that the problem of view obstruction mentioned in prior art is solved as the Doggie Sleeping Hole has no walls. The Doggie Sleeping Hole allows a dog to sleep in any direction it wishes. The dog, when resting its body in the recessed hole, and its head on the shelf provided may sleep comfortably, while keeping all senses alert. The problem with the pillow-type dog beds is solved as the dog may snuggle against the inside of the hole for security. The Doggie Sleeping Hole further solves the problem of assembling and disassembling the bed for washing, as it is a single-piece, liquid-impermeable unit, and cleaning is as easy as removing the fabric cover and placing it in a washing machine. The liquid impermeable outer skin or covering further provides a healthier, cleaner environment as there are no crevices giving opportunity for the build-up of debris.

Lastly, and most importantly, this bed is created for the purpose of providing a sound, secure, and more natural sleeping environment for dogs, just as nature intended.

REFERENCE NUMERALS IN DRAWINGS

1—Basic Structure
2—Hole contained in Basic Structure
3—Perimeter of Hole
4—Head/Elbow Shelf
5—Side of Basic Structure (Height)
6—Bottom of Basic Structure

DETAILED DESCRIPTION OF THE INVENTION

Figure 1:
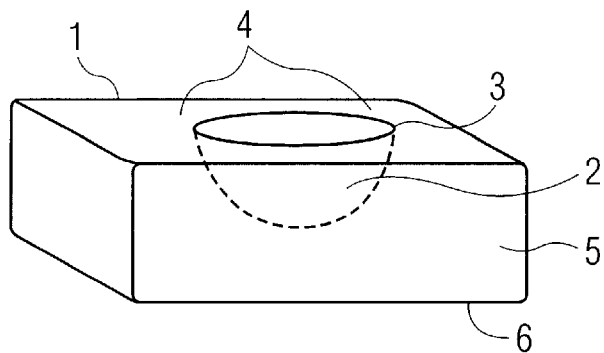
FIG. 1 is a front-perspective view of the dog bed according to the invention.
Figure 3:
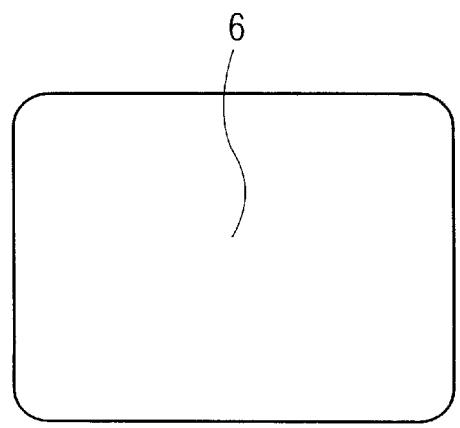
FIG. 3 is a bottom view of the dog bed as represented in FIG. 1.
Figure 5:
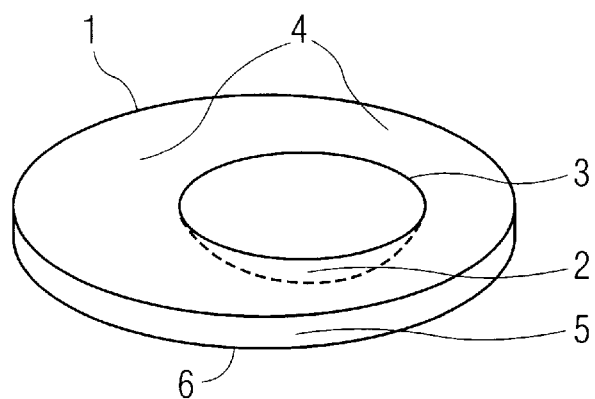
FIG. 5 is a front-perspective view of the dog bed of alternate shape as compared to FIG. 1.
Figure 6:
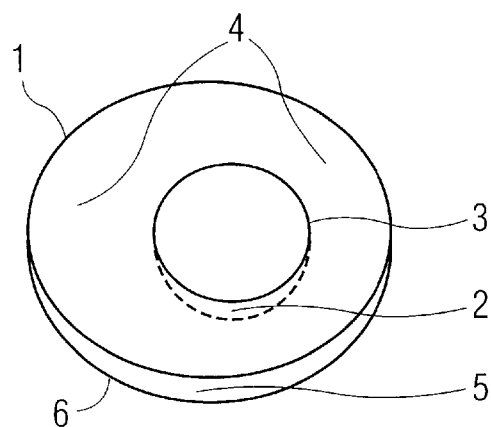
FIG. 6 is a front-perspective view of the dog bed of alternate shape as compared to FIG. 1 and FIG. 5.

Referring now in detail to the drawings entitled FIG. 1 through and including FIG. 6 as referenced above, first being, FIG. 1, there is shown a single-piece foam basic structure 1 of a bed for dogs. The basic structure 1 is illustrated without its removable cover, which may be made of any washable, durable material or fabric available. The basic structure 1 houses a recessed area or hole 2, being either circular or oval in design. This hole 2 is fully contained within the basic structure 1, leaving enough structure beneath the hole 2 to support the weight of any dog lying within it. In FIG. 1, the hole 2 is placed closer to one end of the basic structure 1 to create a larger area on one side of the hole 2 than the other side. However, the hole 2 is not limited to this location and may be placed anywhere within the basic structure 1 that will support the hole 2. Indeed, FIG. 5 and FIG. 6 are representative of the various shapes of the basic structure 1 and options available for location of the hole 2 within the basic structure 1. FIG. 1 further makes reference to a head/elbow shelf 4 which is essentially the basic structure 1 surrounding the top perimeter of the hole 3, as well as the larger area provided atop the basic structure 1. Further, FIG. 1 allows for viewing of the height or side 5 of the basic structure 1. The side 5 may vary in height, and will be governed by the size of the bed being made. Lastly, FIG. I provides a reference to the bottom 6 of the basic structure 1. The reference to the bottom 6 is more particularly set forth in FIG. 3, showing a solid bottom. This reference is made to show that the hole does not go through the basic structure 1 completely, but leaves some of the basic structure 1 beneath the hole 2, causing the hole to be completely contained within the basic structure 1.

Figure 4:
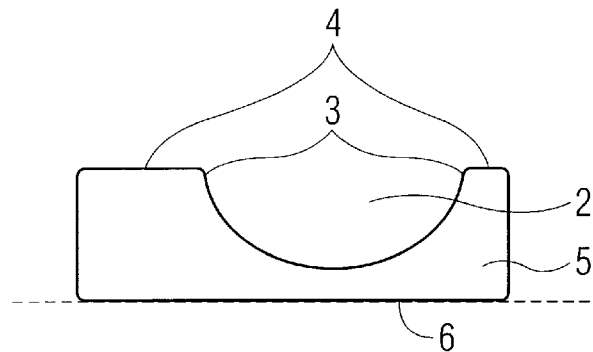
FIG. 4 is a cross-sectional view of the dog bed as represented in FIG. 1 emphasizing the hole and shelf contained therein.

FIG. 4 reveals an up-close view of the hole 2, emphasizing the rounded perimeter 3, and the basic structure 1 surrounding the hole 2.

Figure 2:
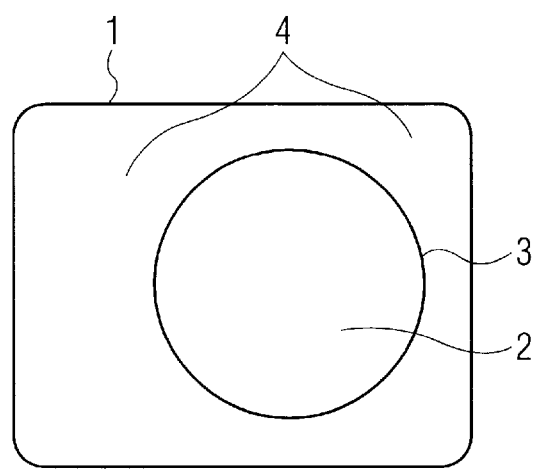
FIG. 2 is a top view of the dog bed as represented in FIG. 1.

FIG. 2 merely shows the identical references in FIG. 1, however, from a different perspective view.

The essence of the Doggie Sleeping Hole is the hole contained in the basic structure, and the head/elbow shelf resulting therefrom. As stated earlier, the Doggie Sleeping Hole uses the opposite approach taken by much of the prior art as the bed described herein provides a sturdy recessed area or hole, while prior art calls for walls to be built.

To better understand this invention, an example of size and dimensions used in a prototype are cited below. This prototype was made for what most would consider a medium-size dog. However, please keep in mind that dogs are all different sizes, and as a result, beds for dogs are made in different sizes as well.

Referring to FIG. 1, the prototype was constructed from a single-piece foam basic structure 1 being 24"×30" (60.96 cm×76.20 cm) in dimension. The height or side 5 of the basic structure 1 was 6" (15.24 cm). The hole 2, was carved out of the basic structure 1 with a diameter of 18" (45.72 cm), leaving 1" (2.54 cm) of basic structure 1 beneath the hole 2. The hole 2 was placed 3" (7.62 cm) from one end of the basic structure 1, leaving a 3" (7.62 cm) head/elbow shelf 4 around the short end of the hole 2, and a 9" (22.86 cm) larger area or head/elbow shelf 4 on the other side of the hole 2.

The Doggie Sleeping Hole revealed in this application can be made a number of ways. Two different ways of making this dog bed will be disclosed herein.

First, this single-piece foam basic structure 1 can be made by way of a mould. The process used is called rotomolding. Essentially a mould is made having the desired dimensions and shape of the bed. The mould may be made of any material chosen by the artisan. The mould is split into halves. The mould is opened and a mixture of plastic powder pellets containing polyethylene resins are placed therein. Once the pellets are in the mould, the two halves of the mould are clamped together. A rotating arm will then attach to the mold and place the mould in an oven at a temperature in or about 400 degrees. The plastic pellets will melt in the mould as the mould is rotated at speeds greater than 8 rpm. while maintaining a 4:1 rotation ratio, for a period of 10 to 15 minutes depending upon the thickness desired. Once melting and rotation is completed, the rotating arm will remove the mould from the oven so that the cooling process can begin. Cooling can be aided by way of fans or water. The end result is a single-unit foam bed, having the desired dimensions and shape, as well as a smooth pin-hole free outer surface or skin. This bed can now be placed in a removable cover, which may be made of any washable, durable material or fabric available.

As an alternative to moulding, the bed can be made of a single-piece, cushion-like foam, available for purchase at any foam retailer. The foam should be of high density to retain its shape when weight is put on it. The base piece is then carved to produce the desired shape and hole contained therein. The base foam is then covered by any material available which would cause it to be liquid-impermeable. The cover will become a permanent part of the foam base unit. This bed can now be placed in a removable cover, which may be made of any washable, durable material or fabric available.

What we claim:

1. A bed for a dog comprising a unitary structure formed of solid material containing a recessed area or hole therein said recessed area or hole being circular or oval in shape and having an unbroken interior wall portion of constant dimension formed therein: said recessed area or hole being located central in said structure; and a head/elbow surface shelf formed about the entire periphery of said recessed area or hole: wherein said recessed area or hole is dimensioned so as to receive the body of a dog therein and said surface is dimensioned so as to support substantially the dog's entire head.

2. The bed of claim 1 wherein said surface is formed of the same material as said unitary structure.

3. The bed of claim 2 further including a removable washable cover.

4. The bed of claim 2 wherein said bed is formed of a material which is impermeable to liquids.

5. A bed for a dog comprising unitary cushion means having a recessed area or hole therein for receiving a dog's body therein, said recessed area or hole being formed by an unbroken interior wall portion of uniform dimensions and shelf means formed about the entire periphery of said recessed area or hole for supporting substantially all of a dog's head or elbow thereon.

6. The bed of claim 5 wherein said shelf means lies entirely in the same plane.

7. The bed of claim 5 wherein said shelf means is formed of the same material as said unitary cushion means.

8. A bed for a dog comprising; a unitary structure, means formed in said unitary structure for receiving the body of a dog therein, said means including a recess or hole having an unbroken interior portion of uniform dimensions about the entire periphery thereof and surface means formed about the entire periphery of said unitary structure for supporting substantially all of a dog's head or elbow thereon.

9. The bed of claim 8 wherein said surface means lies entirely in the same plane.

* * * * *